United States Patent Office 3,481,876
Patented Dec. 2, 1969

3,481,876
MANGANESE ZINC FERRITE CONTAINING CALCIUM OXIDE AND AT LEAST ONE OF TANTALUM OXIDE AND NIOBIUM OXIDE
Teitaro Hiraga, Tokyo, and Syoichi Wakabayasi and Yoshishige Towatari, Akita-ken, and Tadao Inuyama, Tokyo, Japan, assignors to TDK Electronics Company, Limited, Tokyo, Japan, a corporation of Japan
Filed Aug. 12, 1966, Ser. No. 572,140
Int. Cl. C04b 35/64, 35/38; H01f 1/34
U.S. Cl. 252—62.63          2 Claims

ABSTRACT OF THE DISCLOSURE

An improvement in the long-term stability of permeability of a ferrite of the Mn-Zn series is effected by including, in the composition from which the ferrite is produced, both calcium oxide (CaO) and one or another or both of the auxiliary additives niobium oxide ($Nb_2O_5$) and tantalum oxide ($Ta_2O_5$).

---

This invention relates to processes for producing ferrites which show high stability and low losses.

The ferrite of the present invention is adapted to magnetic cores for transformers or filters of communication instruments and is useful to make the instruments small due to its high stability and low losses.

The conventional Mn-Zn series ferrite which is produced according to Japanese Patent No. 234,127 has the composition in mol percentages:

$Fe_2O_3$ ---------------------------------- 50 to 56
MnO ------------------------------------ 24 to 39
ZnO ------------------------------------ Balance These ferrites are very poor as regards the stability of permeability and are characterized by a relative loss coefficient tan $\delta/\mu_0$ of about $1 \times 10^{-5}$ at 100 kc./s. With such characteristics, these conventional ferrites have never been able to meet requirements of telecommunications.

The present invention relates to improvements of characteristics of Mn-Zn series ferrites composed of $Fe_2O_3$, MnO and ZnO as main ingredients.

An object of the present invention is to provide a process for producing ferrites having permeability stability, and other, properties proved to be several times as high as are the characteristics of the conventional ferrites in all respects. Thus, the invention concerns ferrites the fluctuation of the permeability of which for 1 to 1000 seconds after A.C. demagnetization is less than 1.0% and is so slight as to be impossible to actually measure, and the relative loss coefficient tan $\delta/\mu_0$ at a high frequency is less than $2 \times 10^{-6}$. According to the present invention, to the basis $Fe_2O_3$-MnO-ZnO composition there is added 0.03 to 0.30% by weight of CaO based on the basis composition, and also there is added at least one member of the group consisting of $Ta_2O_5$ and $Nb_2O_5$, in which composition total amount of the complex additives may be 0.1 to 0.4% by weight, and the mixture is sintered in a sintering atmosphere of an oxygen pressure of less than 1.5%.

Further, the present invention is to provide a process for producing ferrites wherein, as complex additives are added, even if the sintering temperature is varied by about 100° C., the loss coefficient will not substantially vary and therefore the fluctuation of characteristics can be extremely reduced.

Figure 1:
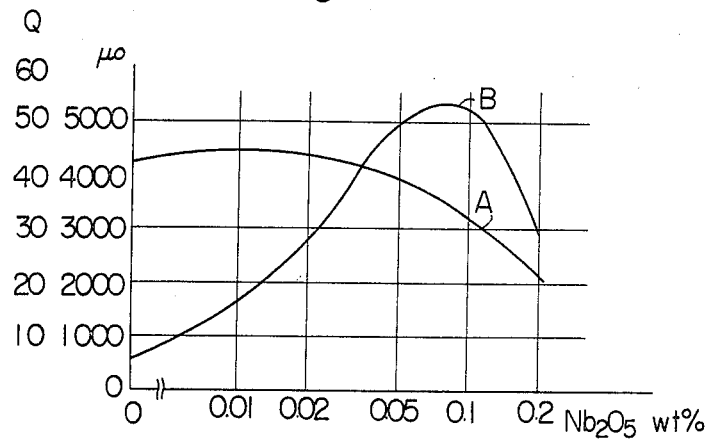
FIG. 1 shows the variation of characteristics with the amount of addition when $Nb_2O_5$ was singly added to a Mn-Zn series ferrite.

In the following described specific examples of the present invention, the methods of producing and measuring the samples were as follows. For the measuring instruments there were used a precision Maxwell bridge and a ferrite core characteristic recording apparatus invented by us.

The shape of the sample was a toroid having an outside diameter of 2.5 cm., inside diameter of 1.5 cm. and cross-sectional area of 0.28 $cm.^2$. In measuring the sample, a silk tape for insulation was wound on it and further a lead wire was wound with 30 turns. The measured values are all represented as values at a frequency of 100 kc./sec. The sample was an Mn-Zn ferrite in which there were used raw materials of a high purity. The results of chemical analyses of impurities in an Mn-Zn series ferrite made of only the raw materials were as follows:

Percent by weight
$SiO_2$ ---------------------------------- 0.01
$Al_2O_3$ -------------------------------- 0.02
CaO ------------------------------------- 0
$Na_2O$ ---------------------------------- 0
Others ---------------------------------- 0

The sample was prepared by making these raw materials complexly contain the additives of the present invention and blending, mixing, premolding, calcining, crushing, molding and sintering them in the order mentioned. The blending and crushing were carried out with a rotary ball mill. The premolding and molding were carried out under pressures of 0.1 and 1.0 tan/$cm.^2$, respectively. As $MnCO_3$ was used in the raw materials, in order to remove $CO_2$ in it and to reduce and stabilize the shrinkage in the sintering, the premolding was carried out at 800 to 900° C. In the sintering, until the temperature was stabilized, when the temperature was to be elevated, an inert gas was used above 600° C. and, just before the temperature was stabilized, the composition of the gas was switched over to an inert gas containing 0.4 to 1.5% oxygen and the sample was cooled. The proper sintering temperature was 1200 to 1300° C.

The composition of the Mn-Zn ferrite of the present invention is substantially the same as is mentioned in the above mentioned Japanese Patent No. 234,127 and need not be specifically limited. However, in the following mentioned examples, samples having a composition of a mol ratio of $Fe_2O_3:MnO:ZnO$ of 53:30:17 were used.

The loss tan $\delta$ of the ferrite is represented by the following relative formula:

$$\tan \delta = \frac{R}{WL} = \frac{1}{Q} = h_1 \sqrt{\frac{L}{V}} \cdot i + e_1 f + c_1$$

wherein

R is an effective resistance ($\Omega$) of the magnetic core,
L is an inductance (L),
V is a volume of the magnetic core and
$h_1$, $e_1$ and $c_1$ are a hysteresis, eddy current and residual loss coefficient.

The above mentioned $h_1$, $e_1$ and $c_1$ vary remarkably depended on the additives. The hysteresis $h_1$ can be reduced by suitably arranging the sizes of crystal grains with the additives. But, if a large amount of the additive is added, above a certain point, the hysteresis $h_1$ will quickly increase. Further, if the specific resistance is elevated, the eddy current $e_1$ can be reduced to so little as to be negligible. The more the additive, the larger is the residual loss coefficient $c_1$. When there is no impurity, the coefficient $c_1$ will be the smallest.

As the loss of the ferrite is comparatively represented by the loss per unit permeability in practice, the point at which tan $\delta/\mu_0$ has the minimum value is important.

In such case, if a large amount of the impurity is added, the permeability will necessarily reduce. Therefore, the point at which the tan $\delta/\mu_0$ is minimum can be determined by the ratio of reductions of tan $\delta$ and $\mu_0$.

Among the functional effects brought about by the added impurities related with present invention are those stated in the following. The results are of the investigations of about 50 kinds of elements having few problems in the practice, price and material procurement.

First, reducing the losses are $Nb_2O_5$, $Ta_2O_5$, $ZrO_2$, $Y_2O_3$, CaO, $SiO_2$ and $WO_3$. Their effects are (1) to reduce the eddy current loss,
(2) to reduce the hysteresis loss and
(3) to reduce the residual loss. Second, varying the stability are those in the following:
    (a) improving the stability are $Nb_2O_5$, $Ta_2O_5$, $ZrO_2$ and, $SiO_2$,
    (b) not varying the stability are $Bi_2O_3$, CrO and $MoO_3$,
    (c) reducing the stability is CaO.

Among them, CaO belonging to the first paragraph is especially high in the loss reducing effect. The larger the amount of addition of each of those belonging to the paragraph 3(a), the higher the stability.

Figure 2:
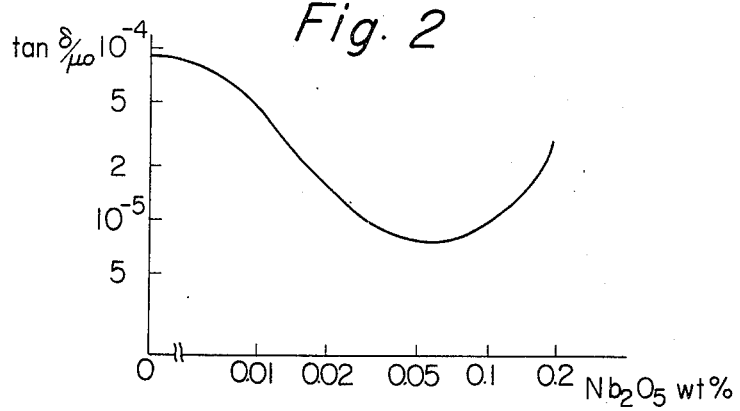
FIG. 2 shows the variation of the relative loss coefficient tan $\delta/\mu_0$ in the same case.

FIGS. 1 and 2 show this tendency with an example of the case of adding only $Nb_2O_5$. FIG. 1 shows the variation of characteristics with the amount of addition when $Nb_2O_5$ was singly added to an Mn-Zn series ferrite. The amount of addition of $Nb_2O_5$ is taken on the abscissa and $Q=(\tan \delta)^{-1}$ and $\mu_0$ are taken on the ordinate. The curve A represents $\mu_0$ and the curve B represents Q. In FIG. 2, the amount of addition of $Nb_2O_5$ is taken on the abscissa and the relative loss coefficient is taken on the ordinate.

$Q=1/\tan \delta$ (curve B) shows a tendency to increase quickly near 0.03% by weight and $\mu_0$ (curve A) also has a favorable value in the same vicinity. Therefore, tan $\delta/\mu_0$ (FIG. 2) reduces quickly as compared with the case of no addition and becomes minimum near 0.06% by weight. Near 0.08% by weight, Q shows the maximum value but the reduction of $\mu_0$ becomes large and therefore tan $\delta/\mu_0$ increases. This tendency is the same also in $Ta_2O_5$ and CaO. It is confirmed that, specifically in the case of CaO, the improvement of tan $\delta/\mu_0$ is most remarkable.

It is evident from the above mentioned graphs that the point (0.08% by weight) at which tan is minimum and the point (0.06% by weight) at which tan $\delta/\mu_0$ is minimum do not coincide with each other. By taking such fact into consideration and noting an additive in which, in case a small amount of it is added, $\mu_0$ will not reduce much but tan $\delta$ will show a tendency to reduce quickly, we have experimentally proved that, when respective small amounts of two or more of additives having such effect and including specifically CaO are simultaneously added, as a result of their multiplied action the greatest effect will be obtained.

We call the effect of complexly adding small amounts of a plurality of such additives having the same tendency a multiplied effect and suggest it as the first feature of the present invention.

That is to say, by carrying out the complex addition by using this multiplied effect, tan $\delta/\mu_0$ which has been about $1 \times 10^{-5}$ can be made less than $2 \times 10^{-6}$ in the present invention and the loss can be reduced to nearly the residual loss.

The effect of improving the stability of the ferrite which is the second feature of the present invention shall now be explained. One of the greatest defects of the ferrite is its instability. This instability is a phenomenon that, with electrical and mechanical impulses, the magnetic characteristics fluctuate and then the permeability gradually diminishes. This is represented by disaccommodation (abbreviated as D.A. hereinafter) after A.C. demagnetization.

In the present specification, the magnitude of D.A. is represented by the rate $$\frac{\mu_1 - \mu_{1000}}{\mu_0} \times 100\% \ (\Delta\mu/\mu_0)$$

of the difference between the permeability $\mu_1$ in 1 second after A.C. demagnetization and the permeability $\mu_{1000}$ in 1000 seconds.

The cause of the instability is a vacancy made by the diffusion of oxygen. However, in case a small amount of CaO is added, the diffusion of oxygen will be made easy and therefore many vacancies will be formed.

Figure 3:
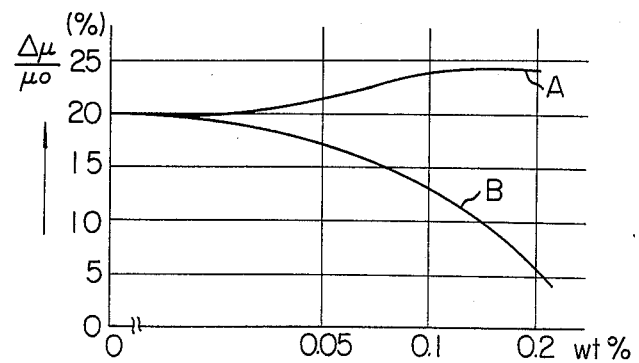
FIG. 3 shows the variation of disaccommodation (abbreviated as D.A. hereinafter) with the addition of the additives.

FIG. 3 shows an example of the variation of the stability of an additive in the case of sintering in air. The amount of addition is taken on the abscissa and $\Delta\mu/\mu_0$ is taken on the ordinate. The curve A represents the case of adding CaO and the curve B represents the case of adding $Nb_2O_5$. When the addition of CaO exceeds 0.05% by weight, the D.A. will show a tendency to gradually increase (curve A).

Figure 5:
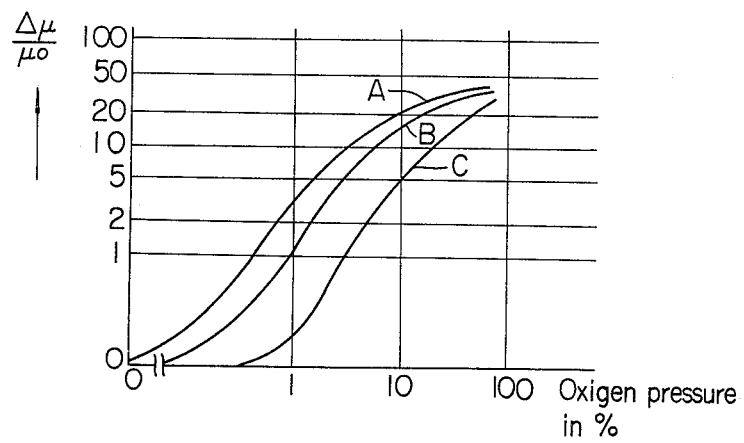
FIG. 5 shows the variation of D.A. with the oxygen pressure in the sintering atmosphere.

On the other hand, in the case of $Nb_2O_5$, as shown by the curve B, the D.A. will reduce and will become stable. In such case, if $Nb_2O_5$ is simultaneously added with 0.1% by weight CaO, the influence of CaO will be eliminated, only the stability improving effect of $Nb_2O_5$ will result and the same tendency as of the curve B in FIG. 3 will be obtained. These are examples of sintering in air. If the oxygen pressure in the sintering atmosphere is varied, $\Delta\mu/\mu_0$ will be the same as in FIG. 5.

That is to say, in comparing the case of adding 0.1% by weight CaO (curve A), the case of no additive (curve B) and the case of containing 0.1% by weight CaO and adding 0.1% by weight $Ta_2O_5$ (curve C), it is found that in the case of the curve C, when the oxygen pressure is below 1.0%, the D.A. will approach zero.

Figure 4:
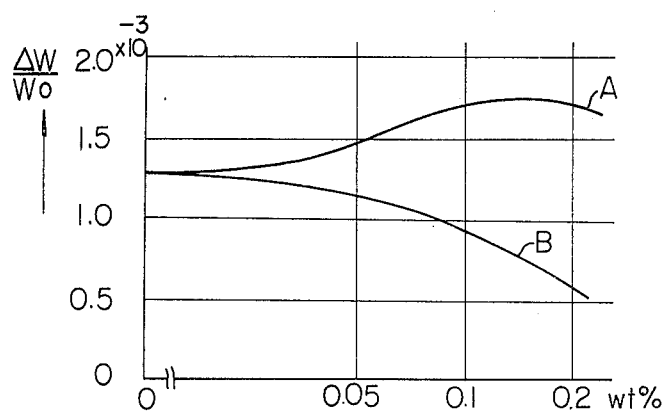
FIG. 4 shows the amount of oxygen absorption ($\Delta W/W_0$) at the time of sintering the ferrite.
Figure 6:
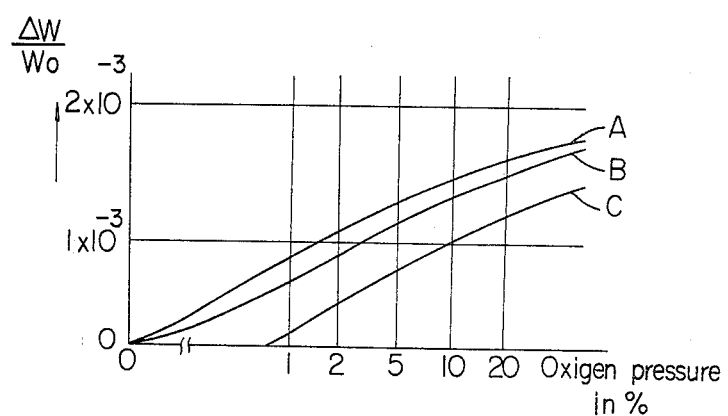
FIG. 6 shows the amount of oxygen absorption.

FIG. 4 shows the variation of the amount of oxygen absorption in case the amount of addition is varied in air. FIG. 6 shows the variation of the amount of oxygen absorption by the oxygen pressure in the sintering atmosphere. In each graph, the amount of addition is taken on the abscissa and $\Delta W/W_0$ is taken on the ordinate. The signs indicating the curves in FIGS. 4 and 6 correspond respectively to those in FIGS. 3 and 5.

Thus, near the amount of addition of CaO of 0.1 to 0.2% by weight, the absorption of oxygen is highest and the ferrite is unstable. But, if such $Nb_2O_3$ and $Ta_2O_5$ as will prevent the diffusion of oxygen and will improve the stability are complexly added to it, the instability due to the addition of CaO will be eliminated and the ferrite will be stabilized as shown by the curve C in FIG. 5.

Figure 7:
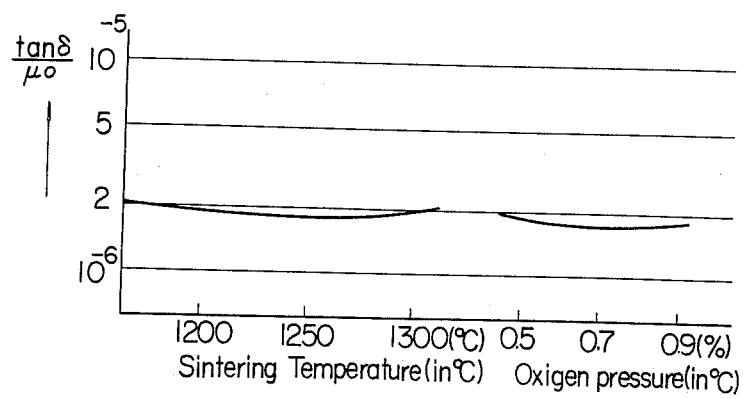
FIG. 7 shows the variation of tan $\delta/\mu_0$ with the sintering temperature and oxygen pressure at the time of sintering.

As in the above, when the additives of the present invention are complexly added, only the merits of the additives will be promoted and a magnetic core of a low-loss ferrite will be obtained. Further, in case such complexly added mixture is sintered, even if the sintering temperature is varied by about ±50° C. and the oxygen pressure is varied by ±0.2%, the value of tan $\delta/\mu_0$ will not substantially vary. This is shown in FIG. 7, which shows that its loss is substantially due to the residual loss.

The respective characteristics in the case of the complex addition shall now be explained.

Figure 8:
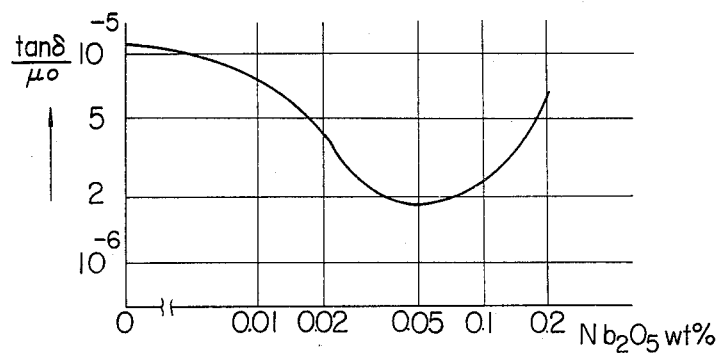
FIGS. 8 and 9 show the variations of tan $\delta/\mu_0$ with the complex addition of $Nb_2O_5$ and CaO.
Figure 9:
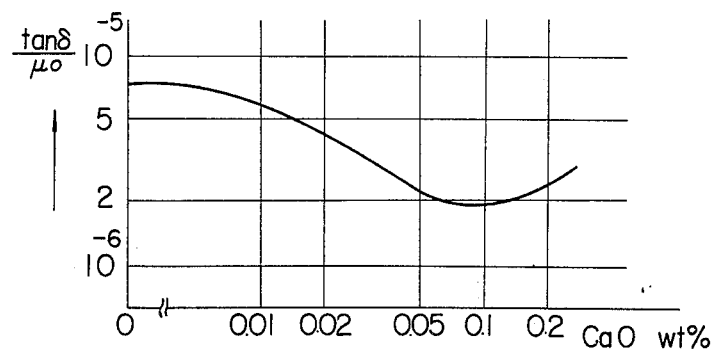

In FIG. 8, 0.1% by weight CaO is fixed, $Nb_2O_5$ is added thereto, the amount of addition is varied and, near 0.05% by weight $Nb_2O_5$, tan $\delta/\mu_0$ has the minimum value. In FIG. 9, $Nb_2O_5$ is fixed at 0.05% by weight, the amount of addition of CaO is varied and, near 0.09% by weight CaO, tan $\delta/\mu_0$ has the minimum value. Thus, in case there is no additive, tan $\delta/\mu_0$ will be $1.2 \times 10^{-4}$. But, when 0.1% by weight CaO is singly added, tan $\delta/\mu_0$ will be $1.18 \times 10^{-5}$ and the characteristic thus will be improved by one figure. When a small amount of $Nb_2O_5$ is further added thereto, tan $\delta/\mu_0$ will be reduced to the order of $10^{-5}$.

Figure 10:
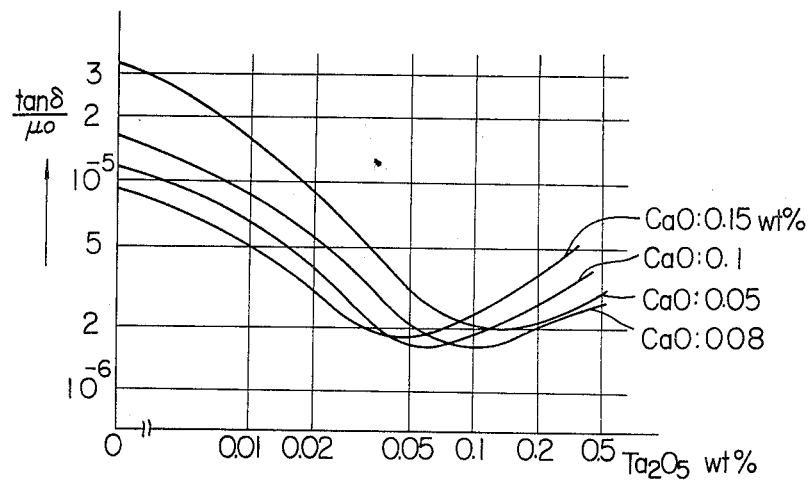
FIG. 10 shows the variation of tan $\delta/\mu_0$ with the complex addition of $Ta_2O_5$ and CaO.

FIG. 10 shows the relation of tan $\delta/\mu_0$ with the amount of addition of $Ta_2O_5$ in each of the contents of 0.05, 0.08, 0.1 and 0.15% by weight CaO. As evident from this, tan $\delta/\mu_0$ reduces more remarkably than in the single addition of CaO. Near 0.08% by weight $Ta_2O_5$, tan $\delta/\mu_0$ shows the minimum.

As evident from these graphs, it is confirmed that, in case any one of $Ta_2O_5$ and $Nb_2O_5$ is added to the basic composition containing CaO, tan $\delta/\mu_0$ will reduce greatly and the magnetic stability will remarkably improve.

The above description relates to the case of complex addition of two kinds. It is difficult to illustrate the case of three or more kinds. However, an example shall be given. In case 0.05% CaO, 0.1% $Ta_2O_5$ and 0.03% $Nb_2O_5$ are complexly added, tan $\delta/\mu_0$ will be $1.71 \times 10^{-6}$. In the case of such complex addition, the range of the amounts of addition and the optimum amounts to make tan $\delta/\mu_0$ $4 \times 10^{-6}$ and $\Delta\mu/\mu_0$ less than 1.0% will be obtained from detailed experiment results as in Table 1 wherein the numerical values in the parantheses ( ) are optimum amounts of addition.

TABLE 1

[Unit: Percent by weight]

| | $Nb_2O_5$ | $(Ta_2O_5)$ | CaO | Total of Optimum Amounts |
|---|---|---|---|---|
| 1 | 0.02–0.15 | | 0.03–0.3 (0.1) | 0.15 |
| 2 | | (0.05) | 0.03–0.4 (0.12) | 0.03–0.15 (0.05) | 0.17 |
| 3 | | 0.03–0.4 (0.07) | 0.03–0.2 (0.09) | 0.16 |

As evident from the above table, it is found that the mean total of the optimum amounts of the additives is 0.16% by weight and that, in the range in which tan $\delta/\mu_0$ is less than $4 \times 10^{-6}$ and $\Delta\mu/\mu_0$ is less than 1.0%, the complex addition must be such that the total amount of the additives is more than 0.1% by weight but less than 0.4% by weight. Such complex addition is not limited only to two kinds but may be so made as to contain a total of 0.1 to 0.4% by weight of CaO and at least one of $Nb_2O_5$ and $Ta_2O_5$.

Examples of loss analysis values are shown in Table 2.

TABLE 2

| Additives in percent by weight | | | $e_1 \times 10^{-3}$ | $c_1 \times 10^{-3}$ | $e_1/\mu_0 \times 10^{-11}$ | $c_1/\mu_0 \times 10^{-7}$ | $h_{10}$ |
|---|---|---|---|---|---|---|---|
| $Ta_2O_5$ | $Nb_2O_5$ | CaO | | | | | |
| 0 | 0 | 0 | 396 | 3.13 | 79 | 6.25 | 32.2 |
| 0.1 | 0 | 0.05 | 4.38 | 1.62 | 1.60 | 5.92 | 6.5 |
| 0.05 | 0 | 0.1 | 3.08 | 1.106 | 1.075 | 3.89 | 7.0 |
| 0.1 | 0 | 0.1 | 3.49 | 0.951 | 1.47 | 4.09 | 6.1 |
| 0 | 0.05 | 0.1 | 3.52 | 0.975 | 1.31 | 3.60 | 9.5 |
| 0.05 | 0.03 | 0.08 | 3.12 | 0.945 | 1.31 | 3.98 | 8.5 |

As is evident from this table, in case the measurements are taken by making an electric current of 0.5 ma. flow at 100 kc., in a ferrite having complex additives, the relative eddy current loss will be 1 to $1.5 \times 10^{-6}$, the relative residual loss will be 0.35 to $0.60 \times 10^{-6}$, the relative hysteresis loss will be 0.15 to $0.20 \times 16^{-6}$ and the total relative loss coefficient tan $\delta/\mu_0$ will be 1.5 to $2.0 \times 10^{-6}$. The fact that about half of the relative loss coefficient is occupied by the residual loss and hysteresis loss shows that, even by such method, the relative loss coefficient tan $\delta/\mu_0$ of about $10 \times 10^{-6}$ is a limit.

As described above, when the additives of the present invention are complexly added and are sintered in a sintering atmosphere having an oxygen pressure of less than 1.0%, the relative loss coefficient will remarkably reduce and a very high stability will be shown. The typical characteristics of the ferrite of the present invention are as follows:

$\mu_0 = 2000$ to 3000 (at 100 kc.)
tan $\delta/\mu_0 = 1.5$ to $2.0 \times 10^{-6}$ (at 100 kc.)
$T_c = 195$ to 250° C.
$\Delta\mu/\mu_0 = 1.8$ to $5.4 \times 10^{-7}$ (at 10 to 60° C.)
$B_{max.} = 3800$ to 4500
$H_c = 0.1$ to 0.2 oe.
D.A. = less than 0.5% (at 1 to 1000 sec.)
$h_{10} = 5$ to 10.

Figure 11:
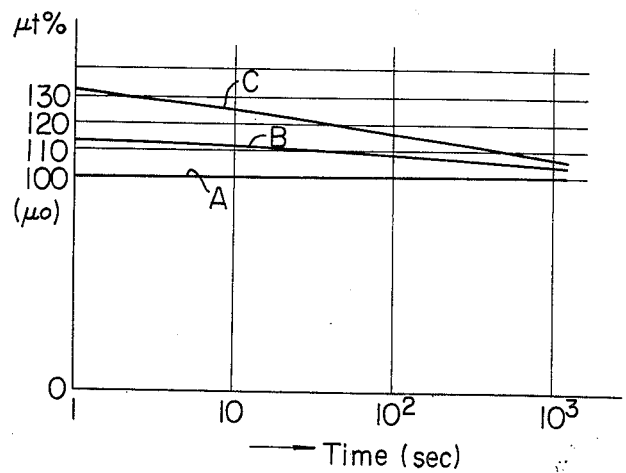
FIG. 11 is an actually measured comparative graph of the product of the present invention and conventional products.

An actually measured comparative graph of the D.A. of a magnetic core of the ferrite of the present invention is shown in FIG. 11 wherein the curve A represents the stability of the product of the present invention and the curves B and C represent the instabilities of conventional products. As evident from this graph, the stability of the ferrite of the present invention is higher than of the conventional Mn-Zn series ferrite of the same kind.

The additive in the present invention is not limited to be in the form of its oxide but may be in a form—for example, its carbonate or oxalate—such that sintering produces its oxide in the final product.

What we claim is:
1. A ferrite consisting of
   a sintered mixture consisting of
      MnO, ZnO and $Fe_2O_3$ as main ingredients, the $Fe_2O_3$ content being 50–56 mol percent, the MnO content being 24–39 mol percent, and the ZnO content being the balance,
   and complex additives as auxiliary ingredients consisting of
      0.03 to 0.30% by weight CaO and at least one member selected from the group consisting of $Nb_2O_5$ in an amount of from 0.02 to 0.15 weight percent and $Ta_2O_5$ in an amount of from 0.03 to 0.4 weight percent,
   the total amount of said complex additives being 0.1 to 0.4% by weight.
2. A process for producing ferrites comprising sintering a mixture consisting of
   MnO, ZnO and $Fe_2O_3$ as main ingredients, the

$Fe_2O_3$ content being 50–56 mol percent, the MnO content being 24–39 mol percent, and the ZnO content being the balance,
and complex additives as auxiliary ingredients consisting of
0.03 to 0.30% by weight CaO and at least one member selected from the group consisting of $Nb_2O_5$ in an amount of from 0.02 to 0.15 weight percent and $Ta_2O_5$ in an amount of from 0.03 to 0.4 weight percent,
the total amount of said complex additives being 0.1 to 0.4% by weight,
in an atmosphere of an inert gas plus oxygen said atomsphere having oxygen pressure of less than 1.5%.

References Cited
UNITED STATES PATENTS 3,106,534 10/1963 Akashi et al. _____ 252—62.59
3,344,072 9/1967 Akashi et al. _____ 252—62.56

TOBIAS E. LEVOW, Primary Examiner
ROBERT D. EDMONDS, Assistant Examiner

U.S. Cl. X.R.
252—62.56, 62.62